United States Patent Office 3,423,941
Patented Jan. 28, 1969

3,423,941
TEMPERATURE AND FLOW REGULATING APPARATUS
Frederick P. Evans, West Hartford, Conn., assignor to Combustion Engineering, Inc., Windsor, Conn., a corporation of Delaware
Filed Dec. 20, 1965, Ser. No. 514,773
U.S. Cl. 60—105
Int. Cl. F01k *13/02;* F22b *33/02;* F22d *7/12*
16 Claims

ABSTRACT OF THE DISCLOSURE

A power generating system having a vortex tube or chamber in the path of movement of a gaseous high temperature and high pressure medium from a source for developing such medium to a turbine to be driven thereby, said vortex tube or chamber being arranged to divide said gaseous medium into a hot component and a cold component, the hot component being delivered to the turbine for driving the same. Said vortex tube or chamber has directly associated therewith a valve member which determines the quantity of the high pressure and high temperature gaseous medium which is delivered tangentially into the vortex tube or chamber. Various temperature sensing and determining means are provided in the system for controlling the adjustment of the valve member of the vortex chamber to insure the delivery of the gaseous medium to the turbine at a temperature closely related to that of the metallic members of the turbine so as to avoid any undue shock and harm being done to such members. The operation of and control of the vortex chamber is such that the temperature of the component of the gaseous medium that is delivered to the turbine may be higher than that of the gaseous medium delivered to the vortex chamber.

---

This invention relates to fluid throttling systems employed in conjunction with temperature regulation, and in particular to a method and apparatus for controllably increasing the temperature of the portion of the throttled fluid being used during low flow operation of a system, such as a steam turbine power plant, above that temperature which would be experienced with ordinary throttling, and effecting a smooth transition to ordinary throttling.

In an attempt to improve power plant heat rates, increasingly higher temperatures and pressures of the motivating fluid have been used. This has been particularly true in steam turbine plants. The use of such high temperatures and high pressures requires that the highest pressure or inlet portions of the turbine be constructed of extremely heavy walls. These thick walls must also be of a high grade alloy material which retains substantial strength at these high temperature levels. With such thick walls, however, there is a substantial problem when temperature transients are encountered. During such a period the inner steam touched surface of the metal will change rapidly while the outer surface of the thick wall lags substantially behind. This is aggravated by the low conductivity which these high alloy materials have. This temperature difference throughout the wall of the material leads to differential expansion between the inner and outer surfaces with high stresses consequently being imposed on the wall. It is accordingly important to operate these units in such a manner as to avoid substantial temperature differences between these walls and the steam passing through the turbine.

The turbine casing stress is, of course, not the only temperature problem during startup. Turbines are being designed with very large rotors, some of these having shafts approaching 36 inches in diameter. On these thick shafts temperature differentials between the outer surface and the core of the shaft present similar stress problems. Also differential expansion during heating between the turbine rotor and the casing can cause rubbing in the turbine seals. Regardless of the particular temperature transient problem presented at a given time on any particular turbine, the turbine has an underlying requirement that steam at a particular desired temperature be supplied. The present invention is not concerned with the particular method of determining this desired temperature but simply recognizes that such a requirement exists and, accordingly, deals with a novel method of obtaining the desired steam temperature. It is realized that temperature measurements from various locations in the turbine or measurements of the time rate of temperature change may be used to determine the required steam temperature. Furthermore, it is not required that one particular sensing means dictate the control through an entire startup, but different type controls may be used, the operator selecting the one which should govern the startup at any particular time. For simplicity, the instant invention is disclosed in relation to the desired temperature as being based on a preselected value above the metal temperature inside the turbine steam chest.

The steam generators must also be built to supply this high temperature steam, and this may satisfactorily be done for full load operation on the steam generator. This same steam generator must supply the turbine not only at full load but at all loads down to zero load at startup. Steam generators are simply not capable of delivering the high temperatures required by a hot turbine during startup with minimal firing in the steam generator.

When a power plant startup is initiated, the turbine chest material may be at any temperature. It could be a cold startup after an extended outage with the turbine chest being at ambient temperature on the order of 70° F. The other extreme may occur in a situation where an electrical fault has caused the turbine generator to trip off the line and an attempt at restart is made within minutes. In such a situation the turbine chest would be at an extremely high temperature, such as 1050° F.

Startups of these two extremes are still relatively rare occurrences with a cold startup being only performed after an annual outage for maintenance while the red hot startup occurs only in the event of isolated failures. The nature of the electrical load on power plant systems has produced the situation where these high temperature boilers are frequently shut down overnight and started again in the morning. At this time the turbine chest will still be at a rather high temperature, on the order of 800° F., while the steam generator has cooled down considerably, probably being on the order of 400° F.

The temperature matching problem is further aggravated by a temperature drop which occurs in the throttling of steam by the turbine throttle valve and, therefore, whatever temperature the steam generator can produce is further degraded. During startups the turbine, having no steam flow through it, has a pressure in the turbine chest which is approximately the same as the condenser pressure while the boiler is operating at high pressure. This high pressure boiler operation is generally imposed on the system due to various water circulation and distribution problems involved in the steam generator itself.

The damage due to the temperature mismatch during startup operation is of an accumulative nature. It is unlikely that a single startup would in itself cause a failure but repeated cycles start fatigue cracking and subsequent failure of the turbine parts. When the steam temperature is lower than the metal temperature, cooling or quenching of the metal occurs resulting in tensile stresses at the cooled surface, while the reverse cycle of high compressive stresses at the internal surface is also a factor when the metal of the turbine is colder than the steam.

Various approaches have been made in an attempt to solve this problem, including throttling valves located within the steam generator between superheater sections, low pressure operation of the steam generator at startup, operating the boiler at a relatively high load with a bypass system, and a high speed, hopefully coordinated, startup where the unit is over-fired and considerable manpower is placed on the unit to watch various danger points. While each of these startups is successful to some extent in coping with this problem, each suffers from a number of deficiencies. Also, since the damage is of an accumulative nature, improvements in each of these schemes is required to reduce the amount of damage on each startup even further, particularly in units which are faced with daily startups. This invention may be used independently or in conjunction with the various partial solutions to this problem heretofore employed.

To overcome certain of the harmful effects still present in the attempted solutions of the problems heretofore employed, this invention contemplates the use of a valve operating on the principle of the Ranque-Hilsch tube. Vapor from the fluid source is introduced tangentially into the interior of the tube. Any condensate which forms is stripped off the inner surface of the tube. The hot stream of the fluid is removed from the outer portion of the core within the tube through a tangentially extending diffuser, while cold fluid leaves the center of the core. The relative quantities of the cold and hot fluid are regulated to control the temperature of the hot fluid. This valve is controlled in accordance with the requirements of the power generation system of which it is a part in the manner set forth in more detail hereinafter.

It is an object of my invention to facilitate startup and low load operation of fluid driven power devices by controlling the temperature of the fluid supplied thereto.

It is a further object to facilitate the startup and low load operation of steam turbines in electric power plants by improving the regulation of the temperature of the steam supplied to the turbine.

It is a further object to efficiently divide a flow of single-phase vapor into a hot and cold stream while simultaneously removing condensation which may occur during the operation.

It is a further object to divide a flow of single-phase fluid into a hot and cold stream while simultaneously controlling the quantity and temperature of the hot stream.

Other and further objects of the invention will become apparent to those skilled in the art as the description proceeds.

With the aforementioned objects in view, the invention comprises a novel mode of operation and a novel arrangement, construction and combination of various elements of the invention, which serve to attain the results desired as hereinafter more particularly set forth in the following detailed description of an illustrative embodiment, said embodiment being shown in the accompanying drawings wherein.

Figure 1:
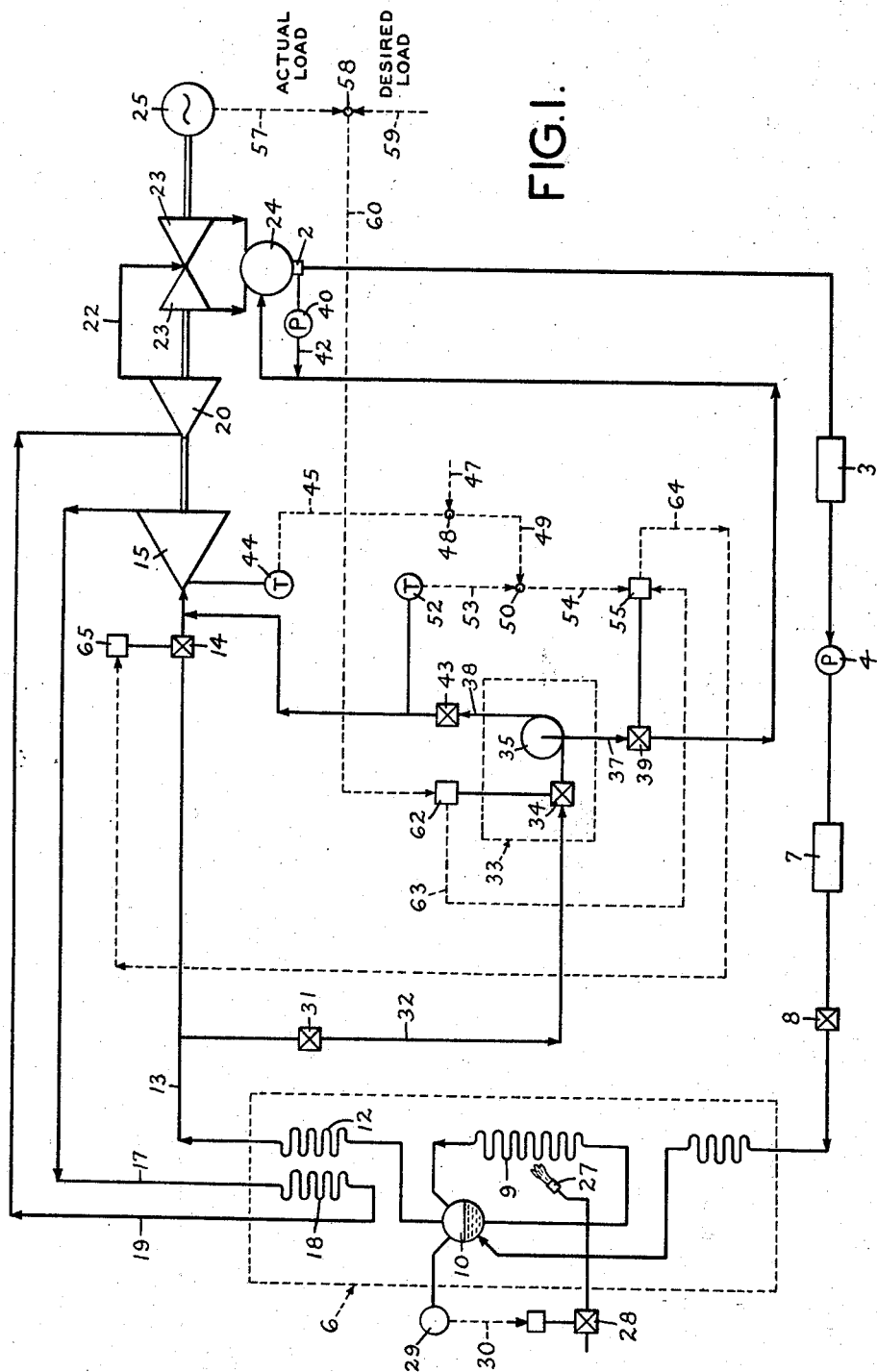
FIG. 1 is a schematic view of a power plant system employing a drum type steam generator and embodying special features which function in accordance with the principles of the present invention.

Referring to the diagram of FIG. 1, feedwater is taken from the condenser hot well 2 through the low pressure feedwater heaters 3. This feedwater is pumped by the feedwater pump 4 to the steam generator 6, passing en route through the high pressure heaters 7 and the feedwater control valve 8. Evaporation occurs in the furnace wall tubes 9 with steam being liberated in the steam drum 10 and passing through the superheater 12 where it is heated to a final steam temperature of say 1,050° F.

During normal operation the steam passes from the superheater 12 to and through the steam line 13 and the turbine throttle valve 14 which controls the steam flow to the high pressure steam turbine 15. The steam discharged from turbine 15 is conveyed through the cold reheat line 17 to the steam reheater 18 of the steam generator 6 and thence through the hot reheat line 19 to the intermediate pressure turbine 20. Steam discharged from the latter then passes through the crossover line 22 to the low pressure turbine 23 from which it is discharged and then condensed in condenser 24 from which it is returned to the hot well 2. The various turbines are shown as being directly connected, through a common shaft, to an electric generator 25 which generates electricity.

In considering the invention it is believed desirable to examine the operation of the power plant during startup. At this time the steam chest of the high pressure turbine 15 which operates during normal operation at about 1050° F. has still a relatively high temperature. If the unit has been shut down for only several hours, the temperature of this steam chest may still be about 900° F.

The steam generator 6 is fired through burners 27 with the fuel being regulated by a full control valve 28. Steam drum pressure is sensed by a pressure measuring device 29 and a signal is sent from the latter through control line 30 to the fuel control valve 28, thereby regulating the amount of fuel delivered to the steam generator to maintain a desired pressure. Steam passing from the drum 10 through steam line 13 at the temperature developed in the steam generator would pass through trottle valve 14 and experience a considerable temperature drop due to the pressure drop, if this turbine were started up in the normal manner after a shut down period. To avoid the temperature drop problem, steam flow during this startup period is passed, in accordance with the present invention, through a startup line 32 to a vortex valve 33. This valve, which will be described in detail hereinafter, in schematically illustrated in this figure. Suffice it to say here that this valve comprises a regulatable inlet valve portion 34 and a vortex chamber 35. The vortex chamber is operated in accordance with the principles of a Ranque-Hilsch vortex tube. It provides means for separating a stream of gas, such as steam, into a cold central component which passes out through cold line 37 and a hot surrounding component which passes out through a hot line 38. It is capable of providing a hot component at a higher temperature than would exist had a straight throttling drop been taken, and under proper operating conditions the temperature of this hot component will be higher than that supplied through the startup line 32. Various theories have been advanced as to how a Ranque-Hilsch tube achieves this result, but it is generally recognized as resulting from the shear work done in the sliding of the gas or steam which is flowing at a high velocity and under pressure into a central cold component and a surrounding outer layer. These components move at different velocities and flow in opposite directions axially of the vortex tube. It is not essential to pin down here the reasons why the initial stream of compressible gas is divided into a cold and hot stream since this is a well recognized result in the operation of a Ranque-Hilsch vortex tube. The present invention simply utilizes that recognized principle, of a suitable vortex tube in a novel combination.

Therefore, during startup, steam enters the vortex valve 33 through the control device 34 and is discharged tangentially, through passages to be described, into the vortex chamber 35. Cold steam is removed from the center of the vortex chamber through line 37 and passes through cold end control valve 39 to the condenser 24. An injection cooler pump 40 pumps condensate from the hot well through an injection line 42, thus desuperheating the flow through the cold steam line 37 before it enters the condenser 24.

The hot flow from the vortex chamber passes out through the hot line 38 and a stop valve 43 and passes therefrom into the steam chest of the high pressure turbine 15.

Initially the turbine throttle valve 14 is closed. Metal temperature in the turbine chest is sensed by temperature transmitter 44 which passes a control signal through control line 45, with the sensing element itself being located about 1 inch from the inside surface of the turbine chest. Temperature difference set point 47 is established so that it is indicative of the desired temperature difference between the steam entering the turbine chest and the temperature of the turbine chest itself. This set point 47 is set at plus 25° F. so that the steam entering the turbine chest will be operative to further heat the turbine chest in anticipation of the high temperatures encountered at full load operation. The temperature difference selected depends on the chest material and thickness, and the rate of temperature rise desired. This set point signal is added at summation point 48 to the actual temperature signal and the signal which then represents the desired steam temperature is passed through control line 49 to the summation point 50.

The temperature of the hot steam being passed to the turbine is sensed by temperature determiner and signal transmitter 52 which passes a control signal through control line 53 to summation point 50, which is representative of the actual steam temperature. A control signal, which then represents the temperature error, passes through the control line 54 to the cold valve operator or controller 55. This then regulates the cold end valve 39 thereby varying the relative flow between the cold end and hot end of the valve and thereby also regulating the temperature of the steam leaving the hot end.

The signal indicative of the actual load on the turbo generator is established in control line 57. This may include two devices, one responsive to turbine speed before the electric generator is synchronized and the other responsive to electrical output after synchronization. The actual load is compared at summation point 58 to a desired load signal established in control line 59. A signal representative of the load error is passed through control line 60 to the slide valve controller 62. This valve controller regulates the position of the valve 34 to control the total steam flow passing to the turbine. Valve 34, as will be further described hereinafter, is preferably a slide valve.

As load on the system is increased, the natural characteristic of the steam generator will cause the temperature of the steam passing through the steam line 13 to increase. Therefore while operating as previously described, cold end control valve 39 will be increasingly throttled since the temperature mismatch of the delivered steam and of the high pressure turbine 15 will be decreased. If the vortex valve system has sufficient capacity, the cold end valve 39 will eventually become completely closed. At this time the separating effect in the vortex valve 33 will cease to operate, and the temperature of the steam passing through the hot line 38 will be the same as it would have been had the steam passed directly in the conventional manner through the turbine throttle valve 14. At this time turbine throttle valve 14 may take over control of the turbine with the vortex valve 33 being removed from the flow path of the system. This valve may then be completely isolated, if desired, by closing stop valves 31 and 43.

Realizing the extreme range of turbine chest temperatures which may occur, it is possible that the capacity limit of the vortex valve system could be reached before the desired steam temperature is obtained. The capacity limit is on the slide valve 34 and if the desired temperature has not been obtained, cold end valve 39 may still be open in an attempt to reach the desired temperature. It should be noted that during the early portion of the startup this valve has operated to achieve the desired temperatures. At this point, however, some sacrifice must be made in the steam temperature in order to achieve smooth transition to normal through-flow through valve 14. Accordingly, when controller 62 indicates that the slide valve 34 is in a wide open position, the control signal indicating load error is passed on from controller 62, through control line 63 to the cold end valve controller 55, and overrides the temperature regulation put in by control line 54. By increasing the throttling of the valve 39, more steam is made available for the high pressure turbine 15 without complete sacrifice of the temperature increasing feature of this valve. When controller 55 indicates that the cold end valve 39 is in a closed position, further increase in turbine loading can only be achieved by opening the main turbine throttle valve 14. Accordingly, when valve 39 is in the closed position, the load error signal entering controller 55 is passed to it through control line 63 and then on through control line 64 to controller 65 which operates the turbine valve 14. At this time the vortex valve system may be taken out of service, and the turbine throttle valve 14 put on normal operation.

An important feature of this arrangement is the ability to control the steam temperature and, accordingly, the system has been discussed in terms of temperature. However, it should be realized that a constant enthalpy device, such as an ordinary throttling valve, results in considerable temperature drop when steam is throttled through it. For instance, steam entering the valve at 2800 p.s.i. and 800° F. would leave the valve and enter the turbine chest at a temperature of about 550° F. where the pressure in the turbine chest is 200 p.s.i. This is true even though the steam at both points has the same enthalpy. The vortex valve actually separates the incoming single phase steam into a high enthalpy portion and a low enthalpy portion. The high enthalpy portion will, of course, have a higher temperature than steam passed through a conventional throttling valve. Although it may not in all cases have a higher temperature than the inlet steam, it will actually have a higher enthalpy. It should, therefore, be realized that even though the temperature of the steam leaving this valve may on occasions be lower than the temperature entering, there is still a significant improvement over the situation which would occur had an ordinary throttling valve been used.

Figure 2:
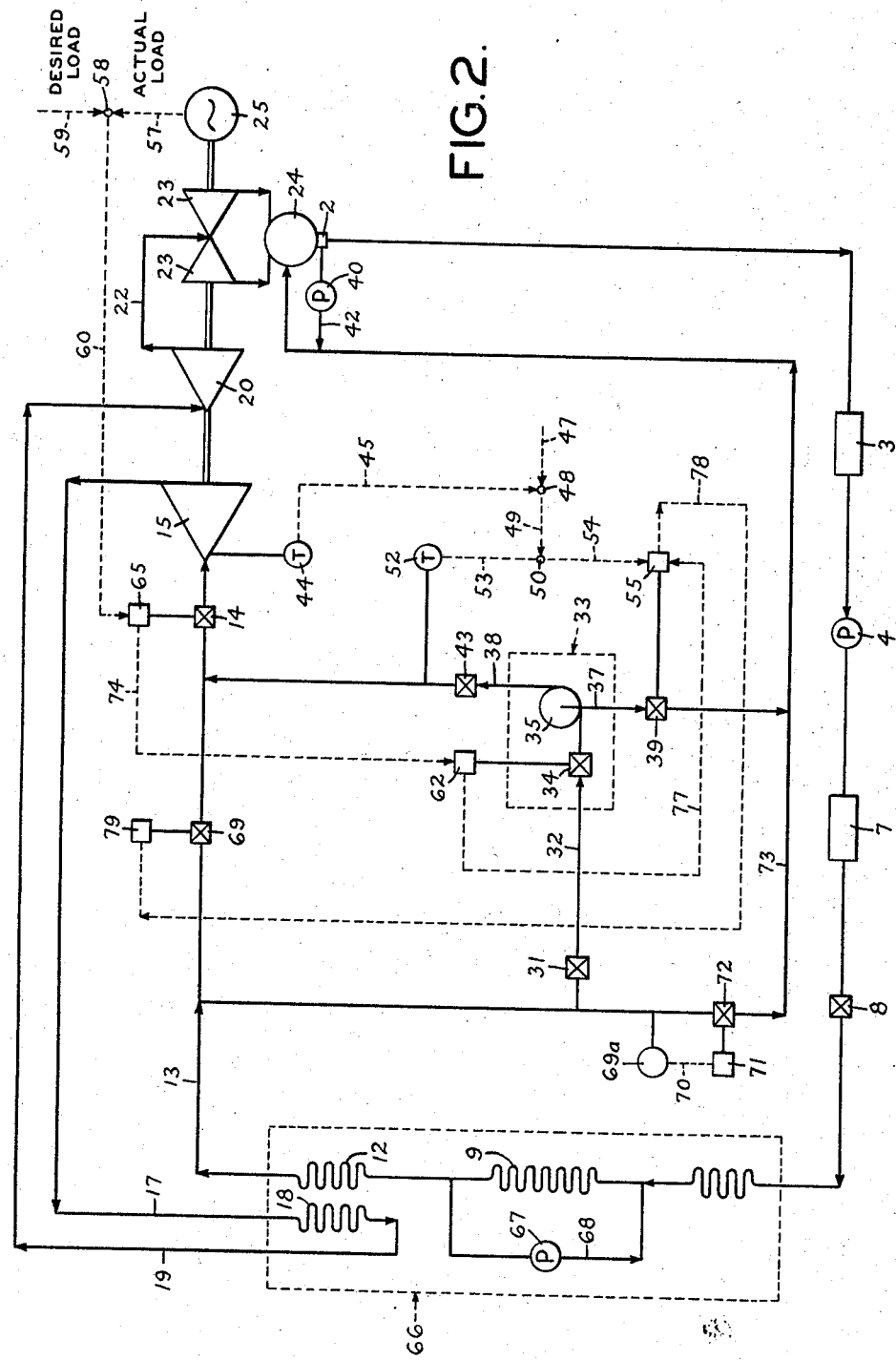
FIG. 2 is a schematic view of a power plant employing a once-through type steam generator and embodying special features which function in accordance with the principles of the present invention.
Figure 4:
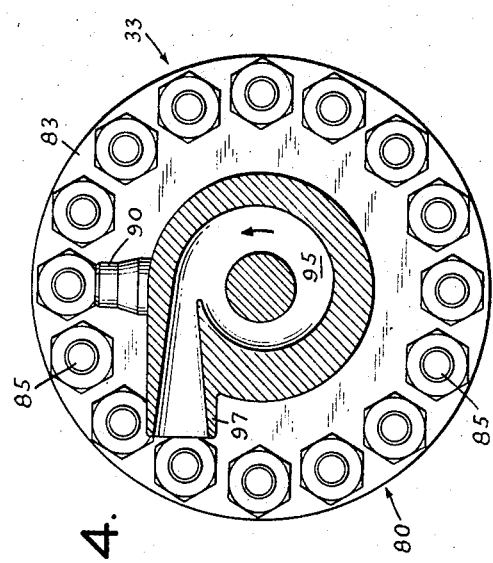
FIG. 4 is a cross-sectional view through the vortex chamber taken along line 4—4 of FIG. 3.
Figure 3:
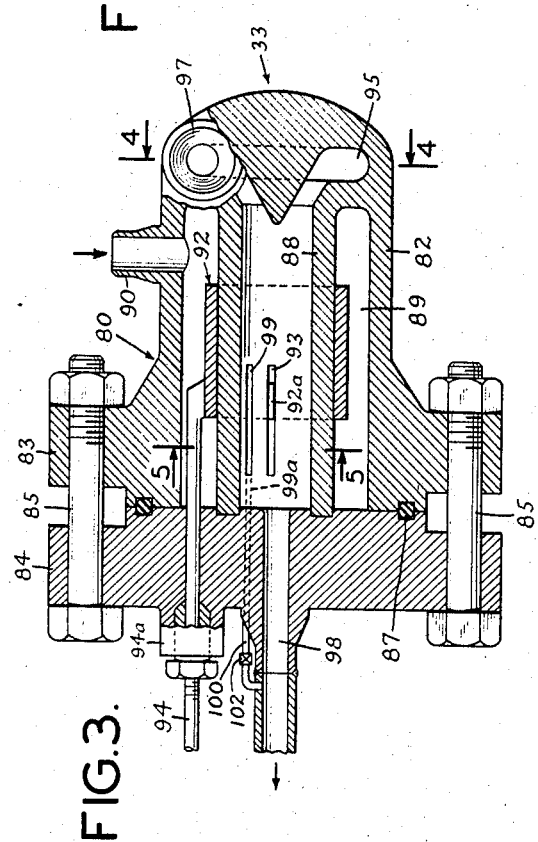
FIG. 3 is a cross-sectional view in a plane through the longitudinal axis of the vortex chamber used in connection with the present invention.

FIGURE 2 is a schematic diagram of a power plant system similar to that of FIGURE 1 wherein the same reference numerals are used to indicate like apparatus. In this embodiment, however, the invention is employed in conjunction with a through-flow type steam generator 66. This steam generator is of the type employing a recirculating pump 67 which is operative to recirculate water through the recirculating line 68, with this boiler being capable of startups with very low through-flows being utilized, i.e. on the order of 5 or 10 percent of the capacity of the boiler. The steam line 13 which conveys the steam to the turbine 15 through the turbine throttle valve 14 incorporates a turbine stop valve 69 located upstream of the turbine throttle valve 14. In the startup of a unit of this type an inexorable through-flow of 5 or 10 percent is maintained and, accordingly, provisions are incorporated to accept this through-flow should it exceed the requirements of the vortex valve 33. This is accomplished by the use of a pressure senser and transmitter 69a which senses the pressure of the fluid leaving the steam generator and which sends a control signal through control line 70 to a controller 71. This controller operates on relief valve 72 which permits flow to pass through line 73 to the condenser 24 whenever excessive pressure occurs in line 32.

The control system incorporated here is generally similar to that of FIG. 1, there being some difference because of the different valving arrangement used. The desired load signal 59 and actual load signal 57 are compared at summation point 58 with the load error signal passing through control line 60. This signal acts on the turbine throttle valve controller 65 which operates the turbine throttle valve 14 to maintain the desired load. In order to avoid temperature drop due to throttling through the turbine throttle valve and to achieve uniform loading on the first stage of the turbine, it is desirable to maintain the turbine throttle valve 14 in a position which is almost wide open. It may be mentioned that if practicable the valve 14 would preferably be maintained in a fully wide open position to minimize the pressure drop therethrough. However in order to enable this valve to exercise some control over the rate of flow of steam from time to time it is desirable to throttle it to some extent. Thus it has been found desirable to maintain it normally at approximately 90% open. The various control means then serve to move it toward this 90% open position from whatever position it may assume in the course of operation of the system. To achieve this, a control signal indicating the valve position is passed through control line 74 to slide valve controller 62 which operates to open the slide valve 34 when the control valve 14 tends to be in a position too wide open, and conversely operates to throttle slide valve 34 when valve 14 is closed more than desired. At this time the temperature of the turbine chest is sensed by temperature transmitter 44 while the temperature of the steam being supplied is sensed by temperature transmitter 52. These signals along with the temperature difference set point 47 operate on the cold end valve 39 to control the steam temperature to the turbine as desired in accordance with the control scheme described in relation to FIG. 1. Again, however, a situation can possibly be reached wherein the vortex valve 33 has insufficient capacity to supply the desired steam quantity while also regulating temperature. Accordingly, when valve 34 is in a wide open position, the control signal entering slide valve controller 62 is passed on through control line 77 to the cold end valve controller 55. This signal operates to close the cold end valve 39 overriding the temperature control signal which is being supplied to its controller 55. Furthermore, it is possible during this period to have the valve 39 regulated to control the portion of the total flow that goes to the turbine, but it is still possible that even with valve 39 completely closed insufficient steam is flowing to the turbine. Accordingly, when valve 39 is in a completely closed position, the control signal entering through control line 77 passes through the cold valve controller 55 and by control line 78 is conveyed to the turbine stop valve controller 79. The turbine stop valve 69 is then opened to supply any deficiency in steam flow due to the capacity limitations of the vortex valve 33. Stop valve 69 may, of course, be a combination valve of the character disclosed in the June 1962 issue of Power magazine at pages 510 and 511, with a large valve and several small bypasses to aid in controllability of the valve at this time. At this time, with the cold end valve completely closed no enthalpy increase is achieved through the vortex valve, and the vortex valve may be taken out of the system with the turbine stop valve 69 opening fully and all control being taken over by turbine throttle valve 14. The latter may then be opened or closed to any extent required to meet the load conditions. With the addition of stop valve 69 to the FIG. 1 embodiment a similar control scheme operating the turbine throttle means may be used.

Figure 7:
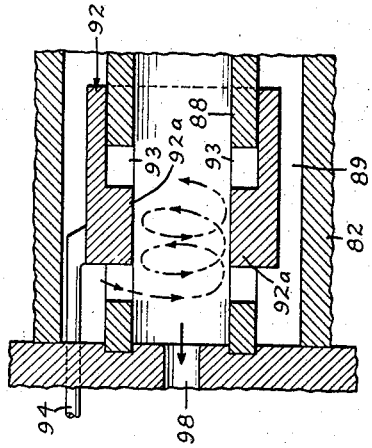
FIG. 7 is a view similar to FIG. 6 but with the slide valve member shown in a partially open position.
Figure 6:
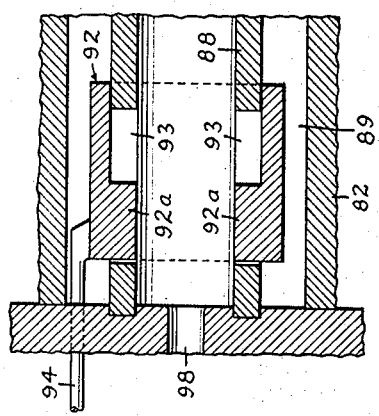
FIG. 6 is a cross-sectional view through a portion of the vortex chamber taken along a horizontal plane through the axis of the chamber as shown in FIG. 5.

FIGS. 3 through 7 show in detail the preferred design of the vortex valve 33. The vortex chamber unit comprises a main housing 80 having a longitudinally extending portion 82 and a radially outwardly extending flange portion 83. A base member 84 is secured to the flange portion of the main body of the housing by means of bolts 85. An O-ring 87 is provided between the main housing 80 and the base member 84 to prevent the escape of steam along the mating faces of these members. Within the main housing 80 the latter is provided with a cylindrical sleeve 88 having a suitable inside diameter and having its outer surface spaced from the inner surface of the main housing to provide an annular chamber 89. Steam is admitted to the annular chamber 89 through an inlet 90 which is suitably connected to the startup line 32 of FIG. 1. Mounted on and surrounding the outer surface of the cylindrical sleeve 88 is a slide valve 92, this slide valve constituting the element designated as 34 in the schematic illustration of the valve of FIGS. 1 and 2. Adjacent the left end of the slide valve 92, as shown in FIGS. 6 and 7, the valve is provided with inwardly extending portions 92a adapted to cooperate with and slide along tangentially disposed channels 93 (see FIG. 5 also) provided in the cylindrical sleeve 88. These channels 93 constitute nozzles through which the steam under high pressure is passed from the annular passage 89 into the interior of the vortex chamber provided within the cylindrical sleeve 88. The inwardly extending portions 92a prevent the stream passing through the channels from expanding longitudinally and dissipating the velocity. The effective length of the nozzle openings 93 in a direction parallel with the axis of the vortex chamber is determined by the position of the slide valve 92. They may be completely closed off when desired and may be opened to a variable extent during the operation of the vortex chamber depending on the desired steam flow.

For shifting the slide valve 92 there is povided a rod 94 slidably mounted in the base mmeber 84 of the vortex chamber unit. A gland or sealing unit 94a serves to insure against the escape of steam around the rod 94. At its inner end this rod is rigidly secured to the slide valve 92. At its other end the rod is connected with the slide valve controller 62 which may be operated to move the rod inwardly or outwardly.

When the incoming steam is delivered through the nozzle openings 93 to the inner chamber, the steam rotates rapidly inside the chamber. According to the Ranque-Hilsch principle the hot flow may be obtained from the outer edge of the vortex with this steam being removed through the scroll 95 and a tangentially disposed pressure recovery diffuser 97. Since the steam which is rotating within this chamber has a very high velocity, the scroll and diffuser are particularly effective to recover this velocity energy through its conversion into pressure energy, thereby decreasing the effective pressure drop of the valve. The cold flow is removed from the central core of the vortex at the opposite end of the valve through the cold end outlet 98.

Figure 5:
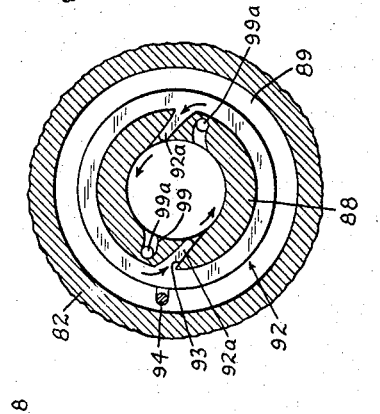
FIG. 5 is a partial cross-sectional view through the vortex chamber taken along the line 5—5 of FIG. 3.
Figure 5A:
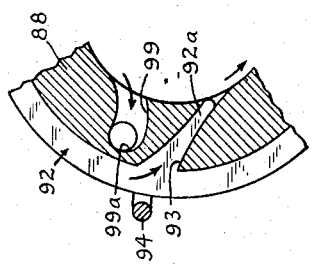
FIG. 5a is an enlarged view of a part of the wall of the vortex chamber.

The vortex device operating according to the Ranque-Hilsch principle develops the hot fluid in the outer surface while the cold fluid is found in the core. However when dealing with steam should the valve operate in such a range that condensation occurs, the heavy water particles will be thrown to the outer surface to centrifugal action. This water phase existing on the outer surface of the valve will be evaporated by the hot stream thereby cooling the hot steam. This would substantially reduce the effectiveness of the valve and, accordingly, it is desirable to remove any droplets that occur. For this purpose water droplet strippers 99 (FIGS. 5 and 5a) are employed and extend longitudinally along the body of the valve throughout the same length as the nozzle openings 93. These strippers, as shown in FIG. 5, are located almost 180° away from each of the nozzle openings 93 so as to give any water particles that may form adequate time to migrate to the surface. Water stripped off by these strippers 99 is conveyed outwardly through holes 99a (FIG. 3) drilled in the casting in alinement with the strippers and tubes 100 connected with said holes. A throttling valve 102 is incorporated in each of the lines formed by the drilled holes and serves to discharge the water from the lines into the cold outlet line 98. The throttling valves 102 must be adjusted to the optimum position for particular steam conditions, since an excessive opening of the valves will short circuit hot fluid to the cold end while an insufficient opening of these valves will leave water on the outer walls of the vortex chamber with a resultant degradation in temperature of the hot end fluid. If desired the tubes 100 may be suitably interconnected outside of the vortex device, and the water discharged through the openings and the tubes may be passed through a single valve 102 for delivery into the cold outlet line.

While a preferred embodiment of the invention has been illustrated and described, and some modifications have been suggested, it is to be understood that these are merely illustrative and not restrictive and that other modifications may be made without departing from the spirit and scope of the invention. For example, the invention is not restricted to steam turbine applications, per se, but may be also employed in the operation of high temperature, high pressure gas turbines, and pipe line applications where throttling of pressure is desired without the normally attendant loss of temperature.

What is claimed is:

1. In a power generating system involving a boiler for generating steam, a turbine driven by said steam and variable load imposing means driven by said turbine, the combination which comprises a vortex chamber having a wall providing a passage of substantially circular cross section in planes transverse to the longitudinal axis of said passage within said chamber, means for introducing steam from said boiler in a tangential direction into said passage, a cold-flow outlet communicating with the portion of said passage that is adjacent its longitudinal axis, a hot-flow outlet communicating with the portion of said passage in a region adjacent the wall thereof, and means for delivering steam only from said hot-flow outlet to said turbine.

2. In a power generating system as set forth in claim 1, a valve connected with said vortex chamber for varying the amount of steam delivered from said boiler tangentially into said passage, and means for operating said valve in response to the load imposed upon said turbine.

3. In a power generating system as set forth in claim 1, a valve for controlling the rate of cold-flow from said vortex chamber, means for sensing the temperature of the steam being introduced into said turbine, means for determining the steam temperature required to avoid undue shock to the metal of said turbine, and means responsive to said temperature sensing and determining means to operate said valve for controlling the rate of cold-flow to maintain the temperature sensed by said temperature sensing means sufficiently close to that indicated by said determining means to prevent deleterious shocking of the metal of said turbine.

4. In a power generating system as set forth in claim 1, said turbine comprising a high pressure component and a lower pressure component, means for delivering steam discharged from said high pressure component of said turbine to the lower pressure component thereof, means cooperating with said last recited means for changing the temperature of said steam so delivered to the lower pressure component of the turbine to meet the temperature requirements thereof.

5. In a power generating system as set forth in claim 2, means adjustable in accordance with the desired load to be met, and means responsive to the setting of said adjustable means for also controlling the operation of said valve.

6. In a power generating system as set forth in claim 2, said vortex chamber wall having at least one tangentially disposed passage therethrough, and said valve comprising a member slidable along the surface of said vortex chamber wall to vary the length of said tangentially disposed passage through said wall to vary the amount of steam delivered into said passage of substantially circular cross-section.

7. In a power generating system as set forth in claim 6, said slidable member having a portion which extends into said tangentially disposed passage to maintain the effective length thereof uniform from the outer to the inner ends thereof.

8. In a power generating system as set forth in claim 1, means within said vortex chamber for removing from the inner surface of the wall thereof any water which may condense thereon, and means for delivering any such removed water to the cold-flow outlet.

9. In a power generating system as set forth in claim 8, said last mentioned means including an adjustable valve.

10. A power generating system involving means for developing a high temperature and high pressure gaseous medium, a turbine driven by said gaseous medium and variable load imposing means driven by said turbine, the combination which comprises a vortex chamber having a wall producing a passage of substantially circular cross-section in planes transverse to the longitudinal axis of said passage within said chamber, means for introducing a stream of said gaseous medium in a tangential direction into said passage, a cold-flow outlet communicating with the portion of said passage that is adjacent its longitudinal axis, a hot-flow outlet communicating with the portion of said passage in a region adjacent the wall thereof, and means for delivering a stream of said gaseous medium only from said hot-flow outlet to said turbine.

11. In a power generating system as set forth in claim 10, a valve connected with said vortex chamber for varying the amount of said stream of gaseous medium delivered tangentially into said passage, and means for operating said valve in response to the load imposed upon said turbine.

12. In a power generating system as set forth in claim 10, a valve for controlling the rate of cold-flow from said vortex chamber, means for sensing the temperature of the stream of said gaseous medium being introduced into said turbine, means for determining the temperature required to avoid undue shock to the metal of the turbine, and means responsive to said temperature sensing and determining means to operate said valve for controlling the rate of cold-flow to maintain the temperatures sensed and determined by said temperature sensing and determining means sufficiently close to each other to prevent deleterious shocking of the metal of said turbine.

13. A power generating system as set forth in claim 10 which comprises: means for delivering the gaseous medium directly from said developing means to said turbine, said delivering means comprising a plurality of valves, one of said valves being constantly open to a substantial extent and being in the path of movement of said gaseous medium directly from said developing means and also in the path of movement from the hot-flow outlet of said vortex chamber, another of said valves being in advance of the path through which said gaseous medium is delivered from the hot-flow end of the vortex chamber and being normally closed at the startup of the system, and means for controlling said second mentioned valve in response to the temperature difference between the gaseous medium being delivered to the turbine and the temperature within the chest of the turbine.

14. A device for separating a flow of a hot gaseous medium into a cold component and a hot component comprising: a vortex tube having a wall providing a passage of substantially circular cross-section in planes transverse to the axis of the tube, means for introducing a hot gaseous medium in a tangential direction into said passage, said means comprising a tangentially disposed opening through the wall of said tube in a region thereof which is substantially cylindrical, a sleeve mounted for close fitting sliding movement in relation to said cylindrical portion of the tube in the region of said opening, means for shifting said sleeve to open and to vary the size of the opening through which said gaseous medium may be introduced into said passage, a cold-flow outlet communicating with the portion of said passage that is adjacent its longitudinal axis, and a hot-flow outlet communicating with the portion of said passage in a region adjacent the wall thereof.

15. In a device of the character set forth in claim 14, said sleeve having inwardly extending portions slidable in close fitting relation to the surfaces of the opening through the wall of said tube substantially to the inner end of said opening.

16. A device as set forth in claim 14 in which said cylindrical portion of said tube has means on its inner surface in circumferential alinement with but spaced substantially from the opening through the wall of the tube for stripping any condensate of said gaseous medium from the inner wall of said tube and discharging such condensate along a path separate from the path of movement of the hot component of said gaseous medium.

References Cited

UNITED STATES PATENTS

| | | | |
|---|---|---|---|
| 1,923,515 | 8/1933 | Stull | 55—455 |
| 2,298,242 | 10/1942 | Wegmann | 55—455 X |
| 2,346,672 | 4/1944 | Fletcher | 55—348 |
| 2,399,842 | 5/1946 | Warner | 55—442 |
| 2,768,707 | 10/1956 | Campbell | 55—455 |
| 2,864,463 | 12/1958 | Campbell | 55—455 X |
| 2,891,632 | 6/1959 | Coulter | 55—455 X |
| 3,034,647 | 5/1962 | Giesse | 55—455 X |
| 3,183,896 | 5/1965 | Lytle et al. | 122—406 |
| 3,286,466 | 11/1966 | Stevens | 60—105 |

MARTIN P. SCHWADRON, *Primary Examiner.*

ROBERT R. BUNEVICH, *Assistant Examiner.*

U.S. Cl. X.R.

122—406; 55—455; 137—25